A. H. SNYDER.
STORAGE BATTERY.
APPLICATION FILED APR. 20, 1920.

1,363,684.

Patented Dec. 28, 1920.
2 SHEETS—SHEET 1.

Inventor
Almond N. Snyder
By his Attorneys
Kenyon & Kenyon

A. H. SNYDER.
STORAGE BATTERY.
APPLICATION FILED APR. 20, 1920.

1,363,684.

Patented Dec. 28, 1920
2 SHEETS—SHEET 2.

Inventor
Alward H. Snyder
By his Attorneys
Kenyon & Kenyon

UNITED STATES PATENT OFFICE.

ALMOND H. SNYDER, OF LANCASTER, NEW YORK, ASSIGNOR TO GOULD STORAGE BATTERY COMPANY, A CORPORATION OF NEW YORK.

STORAGE BATTERY.

1,363,684.　　　　Specification of Letters Patent.　　Patented Dec. 28, 1920.

Application filed April 20, 1920. Serial No. 375,190.

*To all whom it may concern:*

Be it known that I, ALMOND H. SNYDER, a citizen of the United States, and a resident of Lancaster, New York, have invented new and useful Improvements in Storage Batteries, of which the following is a specification.

My invention relates to storage batteries and particularly to means for supporting the free ends of plates and also means for supporting separators and plates.

My invention will be better understood by reference to the annexed drawings forming a part hereof and in which—

Figure 1:
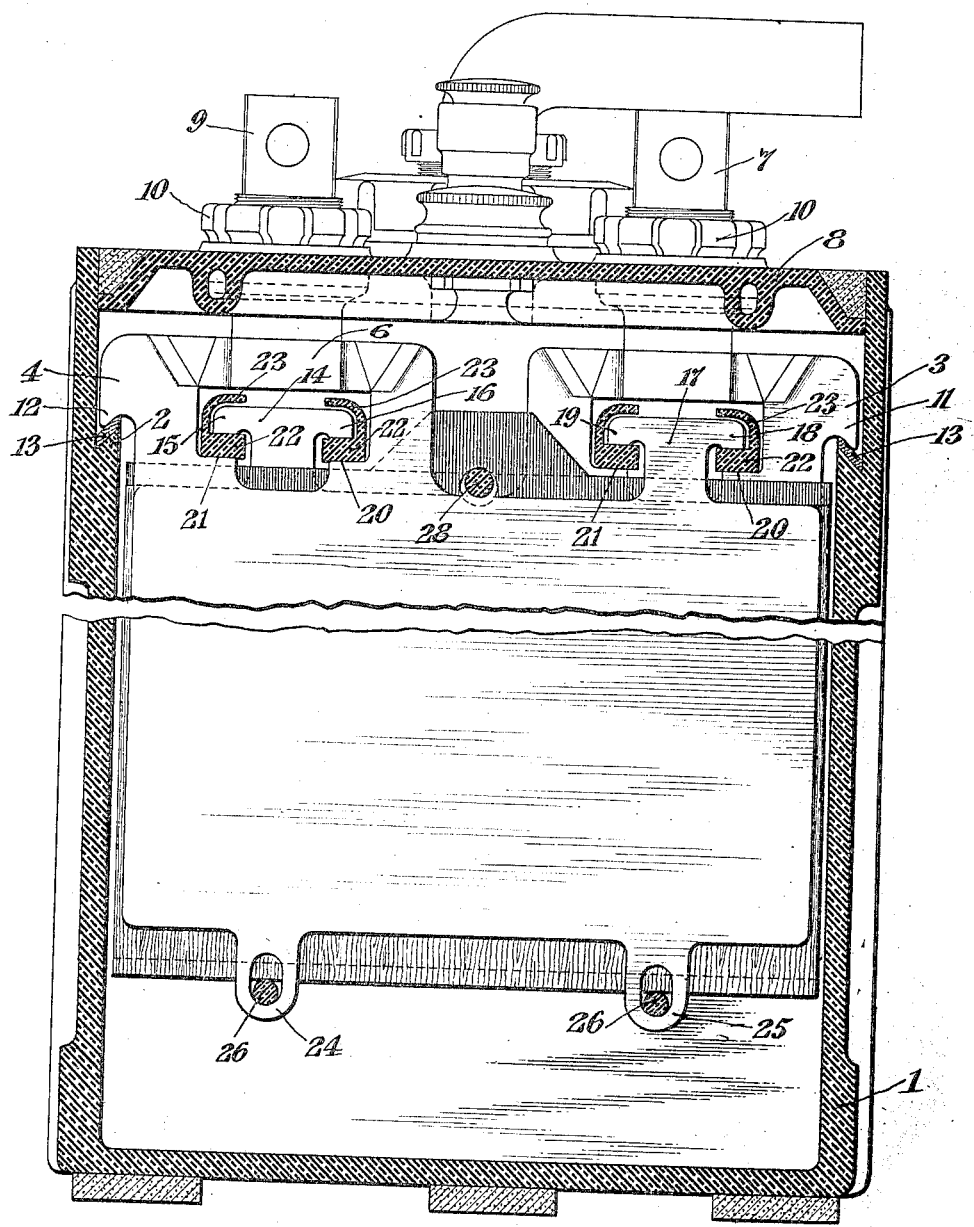
Figure 1 shows a sectional elevation of a battery embodying my invention.

The battery consists of the usual jar 1 having an offset portion 2 on opposite sides thereof. Arranged in the jar 1 are plates 3 and 4. The plates 3 are of the same polarity and the plates 4 are of the same polarity but opposite to that of the plates 3. The plates 3 are connected by lead burning with the terminal 5 and the plates 4 are connected in a similar manner with the terminal 6. Connected with the terminal 5 is a connection 7 leading upwardly through the cover 8. Connected with the terminal 6 is a connection 9 which likewise leads upwardly through the cover 8. The connections 7 and 9 are screw-threaded for a portion of their length above and where they pass through the cover to suit a screw-threaded hard rubber nut 10 which holds the cover down tightly on a soft rubber gasket forming an acid tight joint.

The plates 3 and 4 are provided with projections 11 and 12 respectively. The projections 11 engage the offset portion 2 of one side of the jar 1 and the projections 12 engage the off-set portion 2 of the other side of the jar 1. It is advisable usually to interpose some kind of cushioning substance between the plates and the jar and this material 13 usually takes the form of soft rubber. This somewhat deadens the vibration of the jar 1 which would be transmitted to the plates 3 and 4. Each of the plates 3 as above stated, is connected with the terminal 5 and through this connection the plates are supported at one end by the jar. The other end of each of the plates has a projection 14 extending upwardly therefrom and provided with lateral projections 15 and 16 which extend in opposite directions from each other. The plates 4 are provided with upwardly extending projections 17 which have portions 18 and 19 extending in opposite directions from each other.

Figure 2:
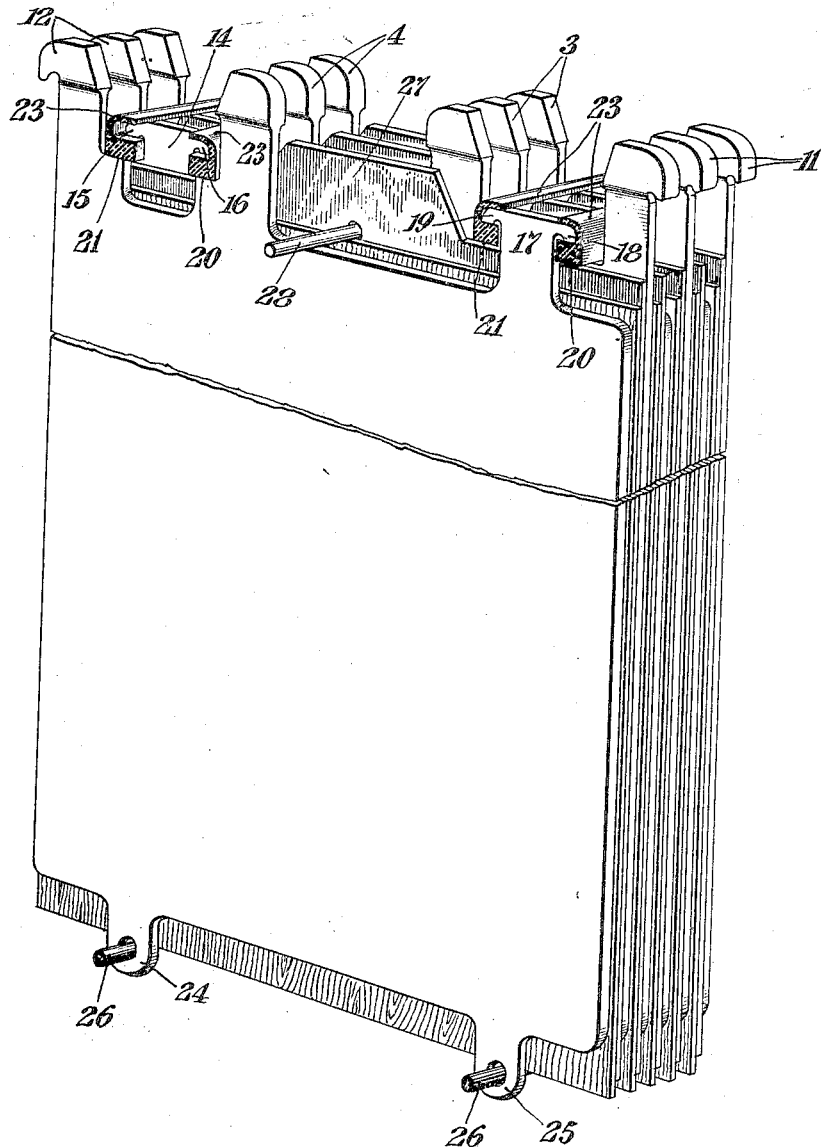
Fig. 2 shows in perspective, the parts assembled.

At the terminal end of each of the plates 3 and 4 is provided horizontal portions 20 and 21. Resting upon each of the horizontal portions 20 and 21 is an insulating supporting member 22 which has a portion 23 extending upwardly therefrom and curving over the projections 15, 16, 18 and 19. The insulating supports rest on the terminal end of the plates and the upper surface of the supports 22 support the free end of the plate of opposite polarity through the lateral projections 15, 16, 18 and 19 which rest on the supports 22. The portion 23 which extends over the lateral projections 15, 16, 18 and 19 acts as a shield or guard to prevent any formation of short-circuits which might come from various kinds of growths and deposits which are unavoidable in storage batteries. By the arrangement above shown it becomes impossible for such deposits to bridge across the plates at the points of support and thereby form local short-circuits which greatly injure the operation of the battery. The supports 22 are slipped into position transversely to the plates and the nest of plates such as that shown in Fig. 2 is then placed in the jar as shown in Fig. 1.

It is customary in batteries of this type to employ a compound separator, to be placed between plates of opposite polarity, the separator being composed of a perforated rubber sheet and a piece of wood. The separators are supported in this instance by providing lugs 24 and 25 on certain of the plates and passing rods 26 through openings in the lugs and upon which rods rest the wood portion of the separator. The hard rubber sheets have portions 27 which extend above the top of the plates, and are provided with openings through which passes a rod 28. The rod 28 rests upon the top of the wood sheets and by that arrangement the rubber separators are suspended from the rod 28 through the wood sheets which rest on the rods 26, which in turn are carried by the lugs on the plates. This avoids the necessity of providing supports in the bottom of the cell for the purpose of supporting the separators and, therefore, leaves the bottom of the cell free of obstructions and provides more space for the deposit of material from the plates and also makes it easier for cleaning out the sediment which inevitably collects in the bottom of storage battery jars.

By providing supports under two lateral projections of the free end of each plate a firmer and stronger support is provided and for certain classes of batteries this means for supporting the free end is preferred.

Having described my invention, what I now claim and desire to secure by Letters Patent is:

1. A storage battery comprising a jar containing positive and negative plates, each having a terminal and a free end, the terminal ends of the positive and negative plates being grouped and connected together respectively at opposite sides of the jar, a projection on the free end of each plate extending upwardly and laterally in opposite directions and a separate support for each of said lateral extensions, each of said supports having a portion extending upwardly over a portion of said projection.

2. A storage battery comprising a jar containing positive and negative plates, each having a terminal and a free end, the terminal ends of the positive and negative plates being grouped and connected together respectively at opposite sides of the jar, a projection on the free end of each plate extending upwardly and laterally in opposite directions, each of said extensions having a horizontal surface and a separate support engaging the said horizontal surfaces and resting on the plates of opposite polarity and acting to support the free ends of the plates.

In testimony whereof I have signed my name to this specification.

ALMOND H. SNYDER.